United States Patent
Wu et al.

(10) Patent No.: US 8,422,134 B2
(45) Date of Patent: Apr. 16, 2013

(54) DUAL PULSED LIGHT GENERATION APPARATUS AND METHOD FOR DUAL PULSED LIGHTS GENERATION THEREOF

(75) Inventors: Ping-Han Wu, Taipei (TW); Kuang-Po Chang, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 402 days.

(21) Appl. No.: 12/826,882

(22) Filed: Jun. 30, 2010

(65) Prior Publication Data

US 2011/0134523 A1 Jun. 9, 2011

(30) Foreign Application Priority Data

Dec. 4, 2009 (TW) .............................. 98141493 A

(51) Int. Cl.
*G02B 27/00* (2006.01)
(52) U.S. Cl.
USPC .......................... 359/593; 359/351; 359/352
(58) Field of Classification Search ................. 359/351, 359/352, 583
See application file for complete search history.

(56) References Cited

U.S. PATENT DOCUMENTS

| | | | |
|---|---|---|---|
| 5,701,201 A * | 12/1997 | Okazaki | ................... 359/485.03 |
| 5,715,084 A | 2/1998 | Takahashi et al. | |
| 6,229,647 B1 | 5/2001 | Takahashi et al. | |
| 6,522,467 B1 | 2/2003 | Li et al. | |
| 6,636,349 B2 | 10/2003 | Takahashi et al. | |

FOREIGN PATENT DOCUMENTS

| | | |
|---|---|---|
| EP | 1586405 A1 | 10/2005 |
| JP | 5072506 | 3/1993 |
| JP | 6138410 | 5/1994 |
| JP | 8262509 | 10/1996 |
| JP | 10051058 | 2/1998 |

* cited by examiner

*Primary Examiner* — James Jones
(74) *Attorney, Agent, or Firm* — WPAT PC; Justin King

(57) ABSTRACT

A dual pulsed light generation apparatus including a polarization beam splitter (PBS), a first polarization reflector, and a second polarization reflector is provided. The PBS has a first plane, a second plane, and a dividing interface located between the first plane and the second plane. The PBS is located in the transmission path of an incident pulsed light and used for dividing the incident pulsed light into a first polarization pulsed light reflected by the dividing interface and a second polarization pulsed light passing through the dividing interface. The first polarization reflector is disposed opposite to the first plane and transforms the first polarization pulsed light into a third polarization pulsed light passing through the dividing interface. The first polarization reflector is disposed opposite to the second plane.

26 Claims, 7 Drawing Sheets

DUAL PULSED LIGHT GENERATION APPARATUS AND METHOD FOR DUAL PULSED LIGHTS GENERATION THEREOF

TECHNICAL FIELD

The present disclosure relates to an optical apparatus, and more particularly, to a dual pulsed light generation apparatus and method for generating dual pulsed light thereof.

TECHNICAL BACKGROUND

With the optical technology available today, there are already many optical apparatus for converting pulsed laser beams into dual pulsed laser beams. Basically, the optical apparatuses are designed to transform one pulsed laser beam into two pulsed laser beams with perpendicular polarization directions, which are together to be referred as a dual pulsed laser beam.

It is noted that dual pulsed laser beams can be used for material processing. For instance, in material surface treatment, it is used for forming anti-reflection micro/nano structures with stain resistance ability on the surface of a material by projecting the dual pulsed laser beams on the material. Moreover, when the dual pulsed laser beams are used for material ablation, not only the material removal efficiency can be improved, but also the amount of heat being generated during the ablation process can be greatly reduced.

The aforesaid optical apparatuses usually are composed of many kinds of optical elements, including splitter, reflective mirror, polarizer, half-wave plate, and so on. Operationally, when a pulsed laser beam is projected into the optical apparatus, it will first be split by the splitter and then the resulted split beams are adjusted in polarization by the use of polarizers and half-wave plates embedded in the optical apparatus, so that a dual pulsed laser beam with perpendicular polarization directions is generated.

TECHNICAL SUMMARY

The present disclosure provides a dual pulsed light generation apparatus for transforming one incident pulsed beam into two pulsed beams.

The present disclosure provides a dual pulsed light generation method that is adapted to be applied in the aforesaid dual pulsed light generation apparatus.

In an embodiment, the present disclosure provides a dual pulsed light generation apparatus, comprising: a polarization beam splitter (PBS), a first polarization reflector, and a second polarization reflector. The PBS has a first plane, a second plane, and a dividing interface located between the first plane and the second plane. The PBS is located in the transmission path of an incident pulsed light and used for dividing an incident pulsed beam into a first polarization pulsed beam reflected by the dividing interface and a second polarization pulsed beam passing through the dividing interface. The first polarization reflector is disposed opposite to the first plane and transforms the first polarization pulsed light into a third polarization pulsed light passing through the dividing interface. The first polarization reflector is disposed opposite to the second plane In an embodiment, the present disclosure provides a method for generating dual pulsed light, comprising the steps of: using a polarization beam splitter (PBS), composed of a light-emitting surface and a dividing interface, to divide an incident pulsed beam into a first polarization pulsed beam and a second polarization pulsed beam while enabling the first polarization pulsed beam to be reflected by the diving interface and the second polarization pulsed beam to travel passing through the dividing interface and then out of the PBS from the light emitting surface; transforming the first polarization pulsed beam into a third polarization pulsed beam capable of traveling passing through the dividing interface while enabling the third polarization pulsed beam to travel passing the dividing interface; transforming the third polarization pulsed beam into a fourth polarization pulsed beam; and enabling the fourth polarization pulsed beam to be reflected by the dividing interface and thus discharged out of the PBS through the light emitting surface.

From the above description, it is noted that the dual pulsed light generation apparatus is capable of dividing an incident pulsed beam into two polarization pulsed beams, i.e. the first polarization pulsed beam and the second polarization pulsed beam, while enabling the polarization directions of the two to be perpendicular to each other. Moreover, that dual pulsed light generation apparatus of the present disclosure is able to produce dual pulsed laser beams for any material processing process available today.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1A:
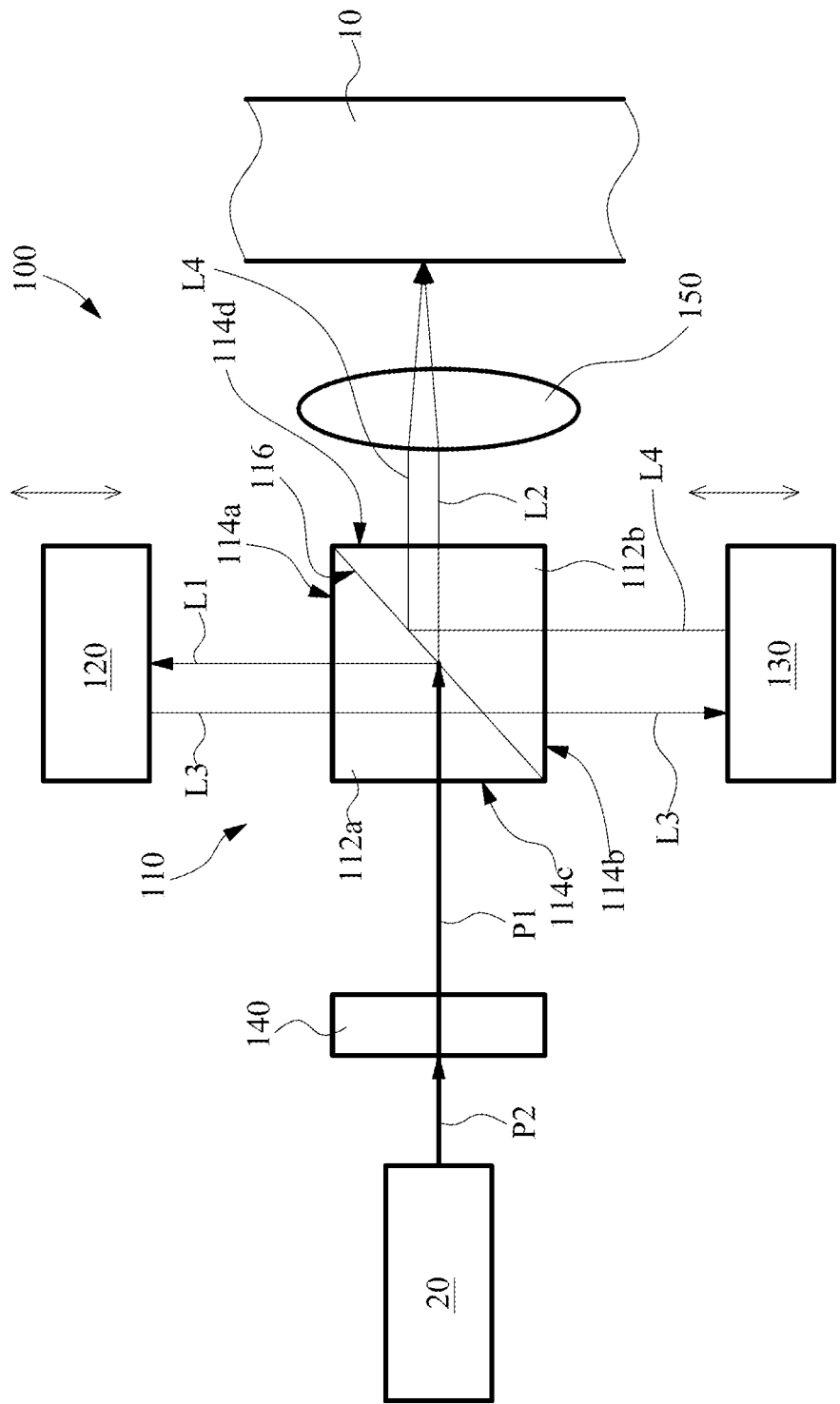
FIG. 1A is a schematic diagram showing a dual pulsed light generation apparatus according to a first embodiment of the present disclosure.

Please refer to FIG. 1A, which is a schematic diagram showing a dual pulsed light generation apparatus according to a first embodiment of the present disclosure. In FIG. 1A, the dual pulses light generation apparatus 100 is composed of a polarization beam splitter (PBS) 110, a first polarization reflector 120 and a second polarization reflector 130, in which the PBS 110, being composed of two prisms 112a and 112b, is configured with a first plane 114a, a second plane 114b and a dividing interface 116.

The dividing interface 116 is an interface between the two prisms 112a, 112b, so that it is a plane disposed at a position between the first plane 114a and second plane 114b of the PBS 110, whereas the first plane 114a is located opposite to the second plane 114b. As shown in FIG. 1A, the first polarization reflector 120 is disposed opposite to the first plane 114, and the second polarization reflector 130 is disposed opposite to the second plane 114b, by that the PBS 110 is disposed between the first polarization reflector 120 and the second 130, i.e. the first polarization reflector 120 and the second polarization reflector 130 are disposed respectively corresponding to two opposite sides of the PBS 110.

It is noted that both the first polarization reflector 120 and the second polarization reflector 130 are reflective polarization rotators, such as the magnetic polarization rotators capable of using magnetic field to rotate the polarization direction, by that both the first polarization reflector 120 and the second polarization reflector 130 are able to change their polarization directions. Moreover, the magnetic polarization rotator can be a reflective Faraday rotator.

As shown in FIG. 1A, the dual pulsed light generation apparatus 100 is designed to divide an incident pulsed beam P1 into two polarized pulsed beams with perpendicular polarization directions while enabling the two beams to project onto an object 10 for processing the same, in which one of the two polarized pulsed beams is a s-polarization light while another is a p-polarization light, and the object 10 can be made of inorganic materials, such as metals, glasses or ceramics. However, the object 10 can be made of organic materials, such as polymers, human or animal skins. Thus, the dual pulsed light generation apparatus 100 not only not be used in industry, but also can be used in other areas such as medication.

Figure 1B:
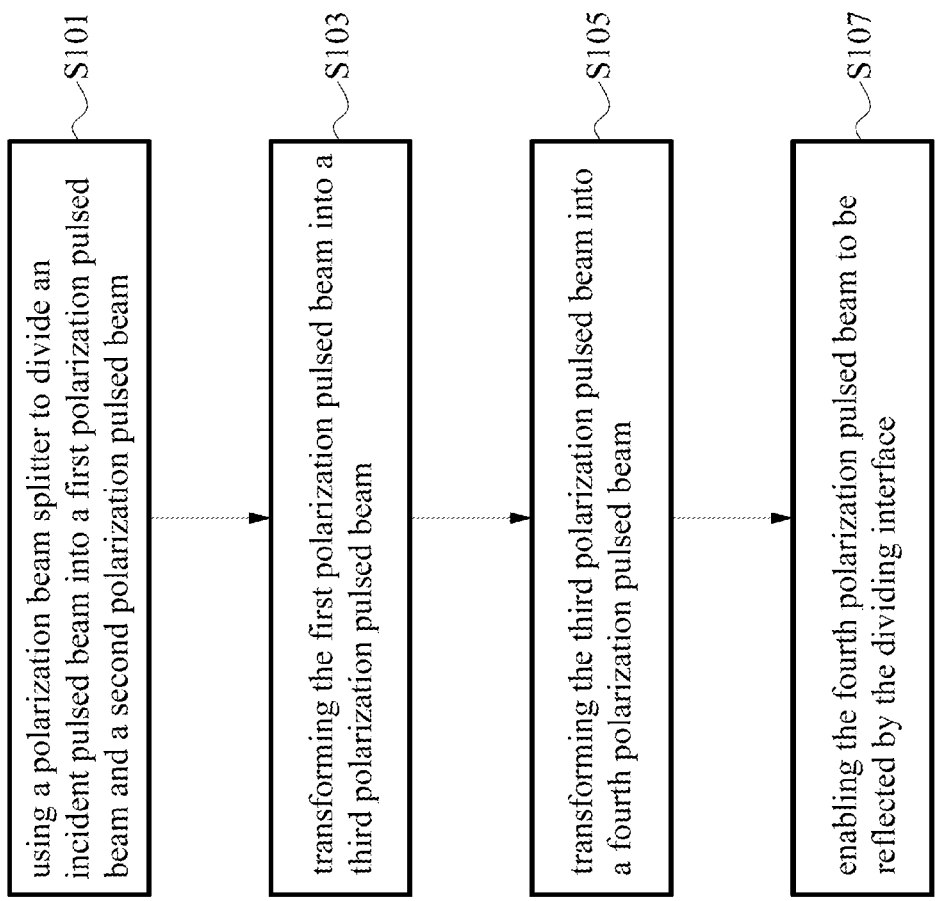
FIG. 1B is a flow chart depicting steps of a method for generating dual pulsed beams that is being performed in the dual pulsed light generation apparatus of FIG. 1A.

Please refer to FIG. 1B, which is a flow chart depicting steps of a method for generating dual pulsed beams that is being performed in the dual pulsed light generation apparatus of FIG. 1A. It is noted that the method shown in FIG. 1B is designed to be executed by the dual pulsed light generation apparatus 100 of FIG. 1A. IN FIG. 1B, the flow starts from step S101. At step S101, a polarization beam splitter (PBS) 110 is used to divide an incident pulsed beam P1 into a first polarization pulsed beam L1 and a second polarization pulsed beam L2; and then the flow proceeds to step S103.

In detail, the PBS 110, being configured with a light receiving surface 114c and a light emitting surface 114d that are opposite to each other, is located on the transmission path of the incident pulsed beam P1 while enabling the incident pulsed beam P1 to enter into the PBS 110 from its light receiving surface 114 and project onto the dividing interface 116.

At the dividing interface 116, the incident pulsed beam P1 is divided into a first polarization pulsed beam L1 and a second polarization pulsed beam L2 with perpendicular polarization directions, while enabling the second polarization pulsed beam L2 to travel passing the dividing interface 116 and out of the PBS 110 from the light emitting surface 114d, and enabling the first polarization pulsed beam L1 to be reflected by the dividing interface 116 and thus travel passing though the first plane 114a. As the polarization directions of the first polarization pulsed beam L1 and a second polarization pulsed beam L2 are perpendicular to each other, the first polarization pulsed beam L1 can be a s-polarization light while the second polarization pulsed beam L2 can be a p-polarization light accordingly.

In this embodiment, the incident pulsed beam P1 can be originated from a pulsed light source 20, such as pulsed laser generators including nanosecond laser generator, picosecond laser generator, and femtosecond laser generator. Thus, the incident pulsed beam P1 is a pulsed laser beam.

Nevertheless, the incident pulsed beam P1 can be originated from a pulsed flash lamp, or a pulsed light emitting diode (pulsed LED). Therefore, the incident pulsed beam P1 can be a medical pulsed light that is not limited to the pulsed laser beam.

In addition, the incident pulsed beam P1 can be originated from a pulsed light source 20 in an indirect manner. That is, the dual pulsed light generation apparatus 100 can further be configured with a wave plate 140 at a position next to the PBS 110 and between the PBS 110 and the pulsed light source 20. In an embodiment, the wave plate 140 can be a half-wave plate. Accordingly, the method for generating dual pulsed beam will comprise the following steps:

(1) enabling a pulsed light source 20 to emit an initial pulsed beam P2, whereas the initial pulsed beam P2 is not necessary to be a pulsed laser beam, so that it can be a pulsed laser beam emitted from a laser generator, or other pulsed beams emitted from pulsed light sources other than laser generators, such as a pulsed flash lamp, or a pulsed light emitting diode (pulsed LED);

(2) locating the wave plate 140 at the transmission path of the initial pulsed beam P2 for enabling the same to travel passing therethrough, wherein the wave plate 140 will adjust the polarization of the initial pulsed beam P2 for transforming the initial pulsed beam P2 into the incident pulse beam P1 containing s-polarization beam and p-polarization beam. In addition, by rotating the wave plate, the energy ratio between the s-polarization beam and p-polarization beam that are containing in the resulting incident pulse beam P1 can be changed, such as increasing the energy of the s-polarization beam while reducing that of the p-polarization beam, or vice versa.

Nevertheless, in another embodiment, the incident pulse beam P1 can be a light emitted directly from a pulsed light source 20. That is, there will be no wave plate 140 required to be disposed next to the PBS 110 for transforming the initial pulsed beam P2 from the pulsed light source 20 into the incident pulse beam P1, so that the initial pulsed beam P2 is projected directly onto the PBS 110. Therefore, the wave plate 140 illustrated in the embodiment shown in FIG. 1A is not an essential element required in the present disclosure.

After the complete of the step S101, the flow proceeds to step S103. At step S103, the first polarization pulsed beam L1 is transformed into a third polarization pulsed beam L3; and then the flow proceeds to step S105. In detail, when the first polarization pulsed beam L1, being reflected by the dividing interface 116, projects on the first polarization reflector 120, the polarization reflector 120 will transform the first polarization pulsed beam L1 into the third polarization pulsed beam L3 while enabling the reflecting the third polarization pulsed beam L3 to be reflected back to the dividing interface 116 and then travel passing the dividing interface 116. Wherein, the polarization directions of the first polarization pulsed beam L1 and the third polarization pulsed beam L3 are perpendicular to each other, so that in an embodiment, the first polarization pulsed beam L1 can be a s-polarization light while the third polarization pulsed beam L3 can be a p-polarization light.

At step S105, the third polarization pulsed beam L3 is transformed into a fourth polarization pulsed beam L4; and then the flow proceeds to step S107. In detail the second polarization reflector 130 will transform the third polarization pulsed beam L3 is transformed into the fourth polarization pulsed beam L4 while reflecting the same back to the PBS 110. Wherein, the polarization directions of the third polarization pulsed beam L3 and the fourth polarization pulsed beam L4 are perpendicular to each other, so that in this embodiment, as the third polarization pulsed beam L3 is a p-polarization light, the fourth polarization pulsed beam L4 should be a s-polarization light.

At step S107, the fourth polarization pulsed beam L4 is reflected by the dividing interface 116. In detail, as the fourth polarization pulsed beam L4, being reflected to the dividing interface 116 by the second polarization reflector 130, is a s-polarization beam, it will be reflected by the dividing interface 116 for projecting the same out of the PBS through its light emitting surface 114d.

From the above description, it is noted that the second polarization pulsed beam L2 and the fourth polarization pulsed beam L4 are both being discharged out of the PBS 110 from the same plane thereof, i.e. the light emitting surface 114d, whereas their polarization directions are perpendicular to each other, that is, in this embodiment, the second polarization pulsed beam L2 is a p-polarization light while the fourth polarization pulsed beam L4 is a s-polarization light. Thereby, both the second polarization pulsed beam L2 and the fourth polarization pulsed beam L4 are projected onto the object 10 for processing the same.

In the present disclosure, the method for generating dual pulsed beams adapted for the first embodiment can further comprise a step for concentrating the second polarization pulsed beam L2 and the fourth polarization pulsed beam L4. For achieving the concentration, the dual pulsed light generation apparatus 100 is further configured with a focusing lens 150, which disposed next to the PBS 110 and on the transmission paths of the second polarization pulsed beam L2 and the fourth polarization pulsed beam L4. Operationally, the focusing lens 150 is able to concentrate the projection of the second polarization pulsed beam L2 and the fourth polarization pulsed beam L4 onto the object 10.

Moreover, in this embodiment, the dual pulsed light generation apparatus 100 is designed to function for changing the optical path difference between the second polarization pulsed beam L2 and the fourth polarization pulsed beam L4, and thereby, controlling the delay time measured between the polarization pulses of the second polarization pulsed beam L2 and the fourth polarization pulsed beam L4 so as to facilitate the processing of the object 10, such as for forming micro/nano-structures on the surface of the object 10, or other material processing process on the surface of the object 10 not only with good material removal efficiency, but also without causing too much heat being generated during the process.

Moreover, the process for changing the optical path difference between the second polarization pulsed beam L2 and the fourth polarization pulsed beam L4 further comprises the step of: changing the length of the transmission path of the third polarization pulsed beam L3. For instance, the first polarization reflector 120 is configured for enabling the same to move relative to the first plane 114a along the transmission path of the first polarization pulsed beam L1, while the second polarization reflector 130 is configured for enabling the same to move relative to the second plane 114b along the transmission path of the third polarization pulsed beam L3.

Accordingly, when the first polarization reflector 120 is enabled to move in a direction approaching or away from the first plane 114a, while the second polarization reflector 130 is enabled to move in a direction approaching or away from the second plane 114b, the length of the transmission path of the first polarization pulsed beam L1 can be increased or decreased correspondingly, in responsive to that the optical path difference between the second polarization pulsed beam L2 and the fourth polarization pulsed beam L4 is changed and consequently the delay time measured between the polarization pulses of the second polarization pulsed beam L2 and the fourth polarization pulsed beam L4 is controlled thereby.

Figure 2:
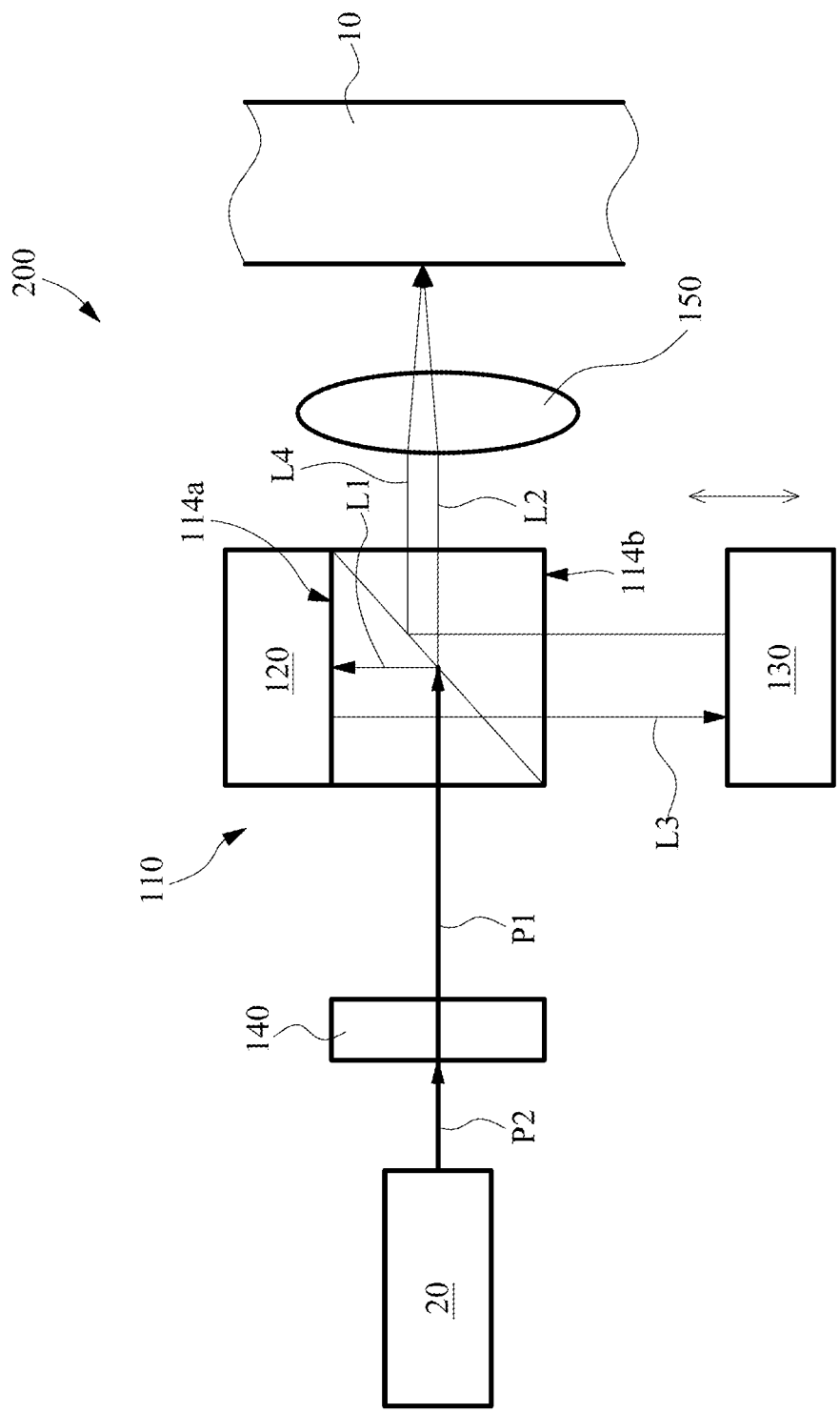
FIG. 2 is a schematic diagram showing a dual pulsed light generation apparatus according to a second embodiment of the present disclosure.

Please refer to FIG. 2, which is a schematic diagram showing a dual pulsed light generation apparatus according to a second embodiment of the present disclosure. Basically, the apparatus 200 of FIG. 2 uses the same method for generating dual pulsed beam as the one that is used by the apparatus 100 shown in FIG. 1A. Moreover, the dual pulsed light generation apparatus 200 in this second embodiment is structured similar to that of the first embodiment and uses the same components as well, but is different from the apparatus 100 of the first embodiment in that: in the dual pulsed light generation apparatus 200 of the a second embodiment, the first polarization reflector 120 is fixed on the first plane 114a of the PBS 110.

Substantially, the first polarization reflector 120 can be fixedly secured to the first plane 114a by means of screwing or adhering, or even by fitting both the first polarization reflector 120 and the PBS 110 inside a frame of shell so as to fixedly secure the first polarization reflector 120 to the first plane 114a.

As shown in FIG. 2, although the first polarization reflector 120 is fixedly secured to the first plane 114a, the second polarization reflector 130 is still configured for enabling the same to move relative to the second plane 114b along the transmission path of the third polarization pulsed beam L3. However, in an other embodiments, it is possible to fix the second polarization reflector 130 to the second plane 114b instead, while allowing the first polarization reflector 120 to move relative to the first plane 114a along the transmission path of the first polarization pulsed beam L1. Therefore, the configuration relating to the arrangement of the first polarization reflector 120 and the PBS 110 shown in FIG. 2 is only for illustration, but is not limited thereby.

Figure 3:
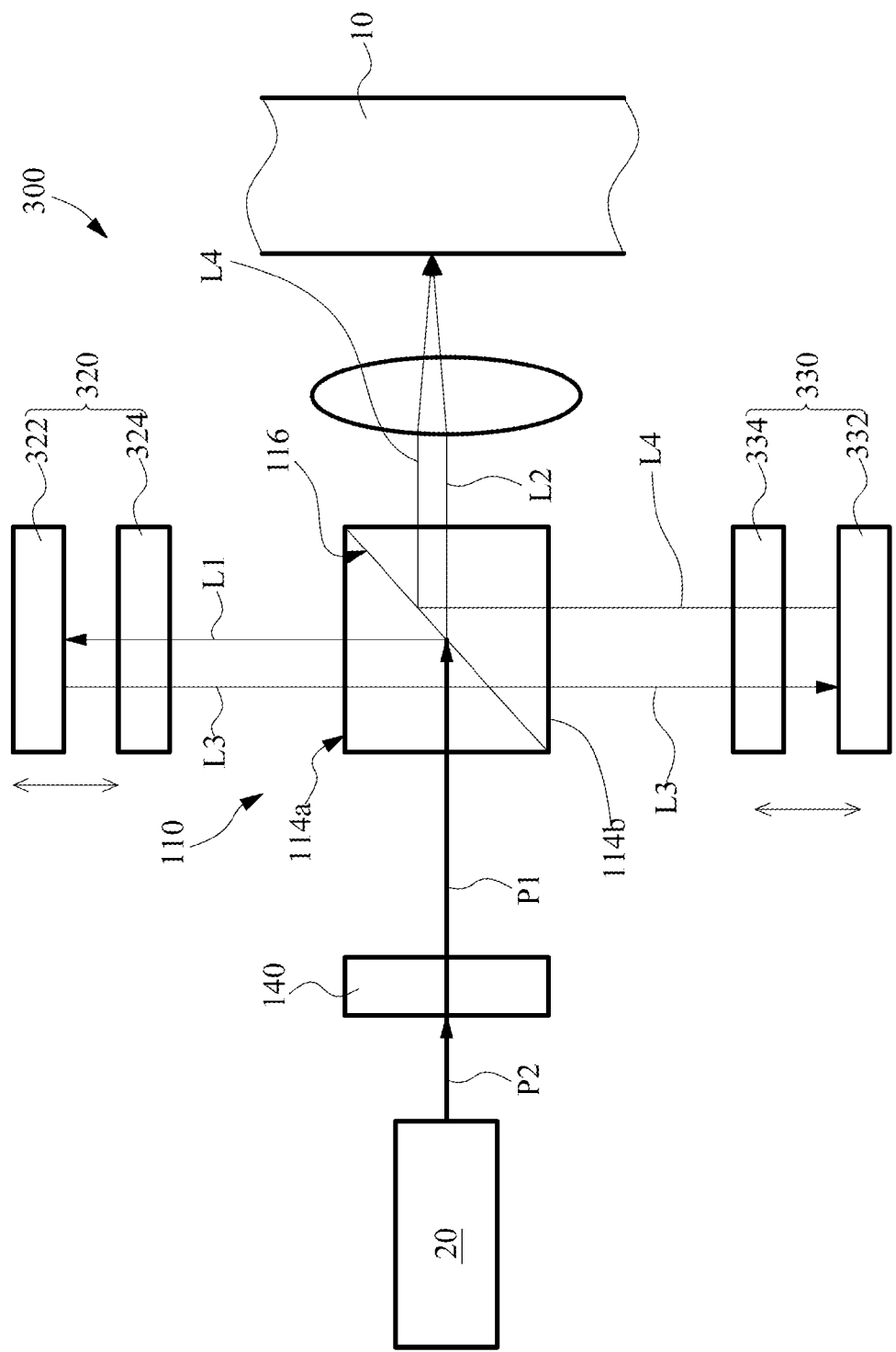
FIG. 3 is a schematic diagram showing a dual pulsed light generation apparatus according to a third embodiment of the present disclosure.

Please refer to FIG. 3, which is a schematic diagram showing a dual pulsed light generation apparatus according to a third embodiment of the present disclosure. Basically, the apparatus 300 of FIG. 3 uses the same method for generating dual pulsed beam as the one that is used by the apparatus 100 shown in FIG. 1A. Moreover, the dual pulsed light generation apparatus 300 in this third embodiment is structured similar to that of the first embodiment and uses the same components as well, but is different from the apparatus 100 of the first embodiment in that: both the first polarization reflector 320 and the second polarization reflector 330 that used in the dual pulsed light generation apparatus 300 are structured different from the first polarization reflector 120 and the second polarization reflector 130 that used in the first embodiment.

Specifically, the first polarization reflector 320 is composed of a first reflection mirror 322 and a first transmissive polarization rotator 324, while the second polarization reflector 330 is composed of a second reflection mirror 332 and a second transmissive polarization rotator 334, wherein each of the first and the second reflection mirrors 322, 332 can be a quarter-wave plate or a magnetic polarization rotator as the magnetic polarization rotator can be a transmissive Faraday rotator.

As the dual pulsed light generation apparatus 300 configured with a PBS 110 shown in FIG. 3, the first transmissive polarization rotator 324 is disposed at a position between the first reflection mirror 322 and the first plane 114a of the PBS 110; and the second transmissive polarization rotator 334 is disposed at a position between the second reflection minor 332 and the second plane 114b of the PBS 110. Thereby, both the first transmissive polarization rotator 324 and the first reflection mirror 322 are disposed on the transmission paths of the first and the third polarization pulsed beams L1 and L3, while both the second transmissive polarization rotator 334 and the second reflection mirror 332 are disposed on the transmission paths of the second and the fourth polarization pulsed beams L2 and L4.

As shown in FIG. 3, the first polarization pulsed beam L1 is projected on the first transmissive polarization rotator 324 so as to be polarized into a circular-polarized pulsed beam which will then be reflected by the first reflection mirror 322 and travel back toward the first polarization rotator 324 again where it is further being polarized and thus transformed into the third polarization pulsed beam L3, whose polarization direction is perpendicular to that of the first polarization pulsed beam L1.

Similarly, the third polarization pulsed beam L3 is projected on the second transmissive polarization rotator 334 so as to be polarized into a circular-polarized pulsed beam which will then be reflected by the second reflection mirror 332 and travel back toward the second polarization rotator 334 again where it is further being polarized and thus transformed into the fourth polarization pulsed beam L4, whose polarization direction is perpendicular to that of the second polarization pulsed beam L2. The fourth polarization pulsed beam L4 is then being reflected by the dividing interface 116, so that it is going to be projected on the object 10 along with the second polarization pulsed beam L2.

In this embodiment, both the first transmissive polarization rotator 324 and the second transmissive polarization rotator 334 are quarter-wave plates, and the included angle measured between the fast axis (or slow axis) of the first transmissive polarization rotator 324 and the polarization direction of the first polarization pulsed beam L1 is about 45 degrees, while the included angle measured between the fast axis (or slow axis) of the second transmissive polarization rotator 334 and the polarization direction of the third polarization pulsed beam L3 is also about 45 degrees.

In addition, the first reflection mirror 322 is configured for enabling the same to move relative to the first plane 114a of the PBS 110 along the transmission path of the first polarization pulsed beam L1, while the second reflection mirror 332 is configured for enabling the same to move relative to the second plane 114b along the transmission path of the third polarization pulsed beam L3. Accordingly, the optical path difference between the second polarization pulsed beam L2 and the fourth polarization pulsed beam L4 is changed and consequently the delay time measured between the polarization pulses of the second polarization pulsed beam L2 and the fourth polarization pulsed beam L4 is controlled thereby.

Figure 4A:
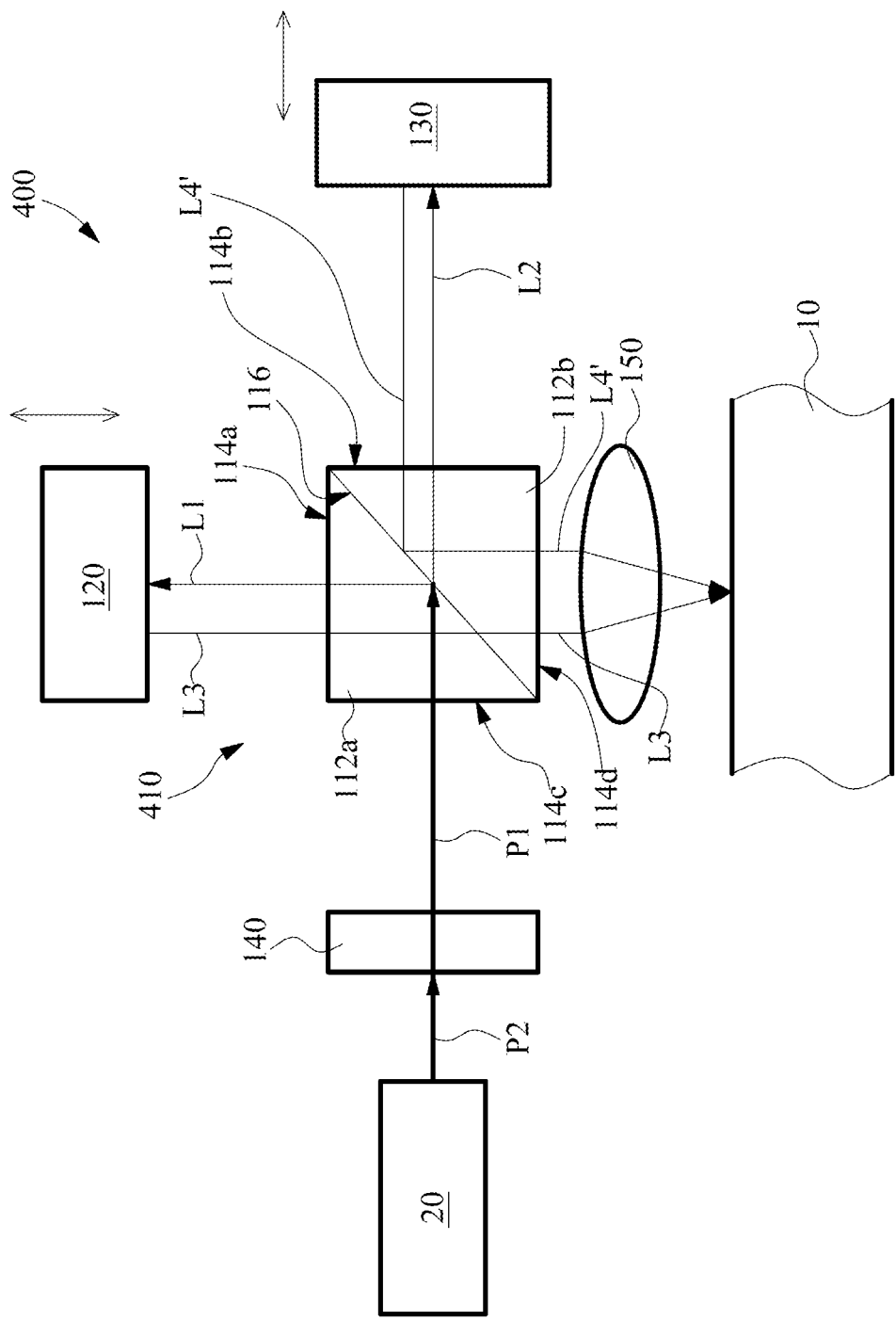
FIG. 4A is a schematic diagram showing a dual pulsed light generation apparatus according to a fourth embodiment of the present disclosure.

Please refer to FIG. 4A, which is a schematic diagram showing a dual pulsed light generation apparatus according to a fourth embodiment of the present disclosure. As shown in FIG. 4A, the dual pulsed light generation apparatus 400 is comprised of a PBS 410, a first polarization reflector 120, a second polarization reflector 130, a wave plate 140 and a focusing lens 150. As the wave plate 140 is disposed and functioning the same as the one disclosed in the first embodiment, it is not described further herein. The PBS 410 is structured similar to the PBS 110 disclosed in FIG. 1A, which is composed of two prisms 112a and 112b, and is also constructed with a first plane 114a, a second plane 114b, a light receiving surface 114c, a light emitting surface 114d and a dividing interface 116 as the dividing interface 116 is an interface between the two prisms 112a, 112b, so that it is a plane disposed at a position between the first plane 114a and second plane 114b of the PBS 410.

The fourth embodiment is different from the first embodiment in that: the first plane 114a is disposed next and connected to the second plane 114b that is opposite to the light emitting surface 114d, and the second plane 114b is disposed opposite to the light receiving surface 114c, whereas the light emitting surface 114d is disposed next and connected to the light receiving surface 114c, so that, in a sense that the first plane 114a and the light emitting surface 114d are located between the second plane 114b and the light receiving surface 114.

Therefore, the first polarization reflector 120 is disposed opposite to the first plane 114a, and the second polarization reflector 130 is disposed opposite to the second plane 114b. Obviously in the fourth embodiment shown in FIG. 4A, the first polarization reflector 120, the second polarization reflector 103 and the PBS 410 are not aligned with each other along a straight line.

Figure 4B:
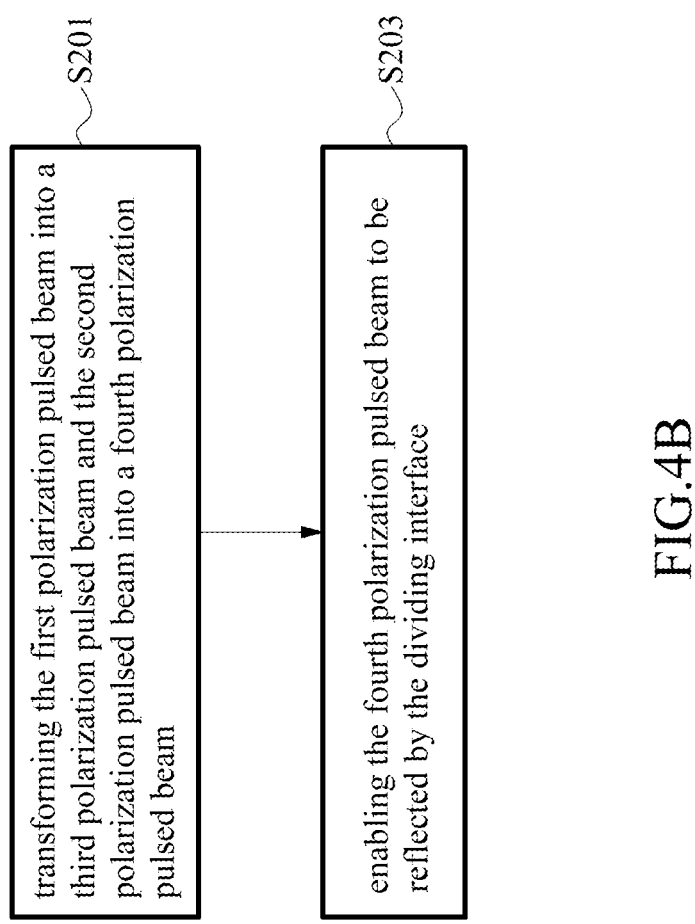
FIG. 4B is a flow chart depicting steps of a method for generating dual pulsed beams that is being performed in the dual pulsed light generation apparatus of FIG. 4A.

Please refer to FIG. 4B, which is a flow chart depicting steps of a method for generating dual pulsed beams that is being performed in the dual pulsed light generation apparatus of FIG. 4A. The method depicted in FIG. 4B is similar to the one depicted in FIG. 1B which is provided for the apparatus of the first embodiment. Nevertheless, as the apparatus of the fourth embodiment is structured different from that of the first embodiment, there will be difference between the method for the fourth embodiment and the method for the first embodiment.

In the fourth embodiment, after an incident pulsed beam P1 is divided by the dividing interface 116 of the PBS 410 into a first polarization pulsed beam L1, that is reflected by the dividing interface 116, and a second polarization pulsed beam L2, that is traveling passing the dividing interfaced 116, the flow will proceeds to step S201 for transforming the first polarization pulsed beam L1 into a third polarization pulsed beam L3, and the second polarization pulsed beam L2 into a fourth polarization pulsed beam L4'.

After being reflected by the dividing interfaced 116, the first polarization pulsed beam L1 will travel passing the first plane 114a and then project on the first polarization reflector, at which it will be transformed into the third polarization pulsed beam L3, while being reflected thereby back toward the dividing interface. At the same time, the second polarization pulsed beam L2, after traveling passing the dividing interface 116, will project on the second polarization reflector 130, at which the polarization pulsed beam L2 is transformed into the fourth polarization pulsed beam L4' while also being reflected thereby back toward the dividing interface 116.

As the polarization directions of the third polarization pulsed beam L3 and the fourth polarization pulsed beam L4' are perpendicular to each other, in this embodiment that the third polarization pulsed beam L3 is assumed to be a p-polarization light while the fourth polarization pulsed beam L4' is assumed to be a s-polarization light. Thus, the third polarization pulsed beam L3 is able to travel sequentially passing the dividing interface 116 and then being discharged out of the PBS 410 through the light emitting surface 114d.

After the complete of the step S201, the step S203 is being executed. At step S203, the fourth polarization pulsed beam L4' is reflected toward the light emitting surface 114d by the dividing interface 116 since it is a p-polarization light and the dividing interface 116 is constructed for allowing only the s-polarization light to pass. Thereby, the fourth polarization pulsed beam L4' is discharged out of the PBS 410 through the light emitting surface 114d as the third polarization pulsed beam L3 did, so that both the third polarization pulsed beam L3 and the fourth polarization pulsed beam L4' can be used for processing the object 10.

In the present disclosure, the method for generating dual pulsed beams adapted for the fourth embodiment can further comprise a step for concentrating the third polarization pulsed beam L3 and the fourth polarization pulsed beam L4'. For achieving the concentration, the dual pulsed light generation apparatus 400 is further configured with a focusing lens 150, which is disposed next to the PBS 110 and on the transmission paths of the third polarization pulsed beam L3 and the fourth polarization pulsed beam L4'. Operationally, the focusing lens 150 is able to concentrate the projection of the third polarization pulsed beam L3 and the fourth polarization pulsed beam L4' onto the object 10.

Moreover, in this embodiment, the dual pulsed light generation apparatus 400 is designed to function for changing the optical path difference between the third polarization pulsed beam L3 and the fourth polarization pulsed beam L4', and thereby, controlling the delay time measured between the polarization pulses of the third polarization pulsed beam L3 and the fourth polarization pulsed beam L4'. Accordingly, the process for changing the optical path difference between the third polarization pulsed beam L3 and the fourth polarization pulsed beam L4' further comprises the step of: changing the length of the transmission path of the first polarization pulsed beam L1.

In detail, as the first polarization reflector 120 is configured for enabling the same to move relative to the first plane 114a along the transmission path of the first polarization pulsed beam L1, in another word that it is able to move in a direction approaching or away from the first plane 114a, the length of the transmission path of the first polarization pulsed beam L1 can be increased or decreased correspondingly, and in responsive to that the optical path difference between the third polarization pulsed beam L3 and the fourth polarization pulsed beam L4' is changed thereby.

However in another embodiment, instead of the changing of the length of the transmission path of the first polarization pulsed beam L1, the process for changing the optical path difference between the third polarization pulsed beam L3 and the fourth polarization pulsed beam L4' can comprises the step of: changing the length of the transmission path of the second polarization pulsed beam L2. In detail, as the second polarization reflector 130 is configured for enabling the same to move relative to the second plane 114b along the transmission path of the second polarization pulsed beam L2, in another word that it is able to move in a direction approaching or away from the first plane 114b, the length of the transmission path of the second polarization pulsed beam L2 can be increased or decreased correspondingly, and in responsive to that the optical path difference between the third polarization pulsed beam L3 and the fourth polarization pulsed beam L4' is changed thereby.

Nevertheless, in other embodiments, the first polarization reflector 120 can be fixed on the first plane 114a while configuring the second polarization reflection 130 in a manner that it is enabled to move relative to the second plane 114b along the transmission path of the second polarization pulsed beam L2; or vice versa that the second polarization reflector 130 can be fixed on the second plane 114b while configuring the first polarization reflection 120 in a manner that it is enabled to move relative to the first plane 114a along the transmission path of the first polarization pulsed beam L1.

Figure 5:
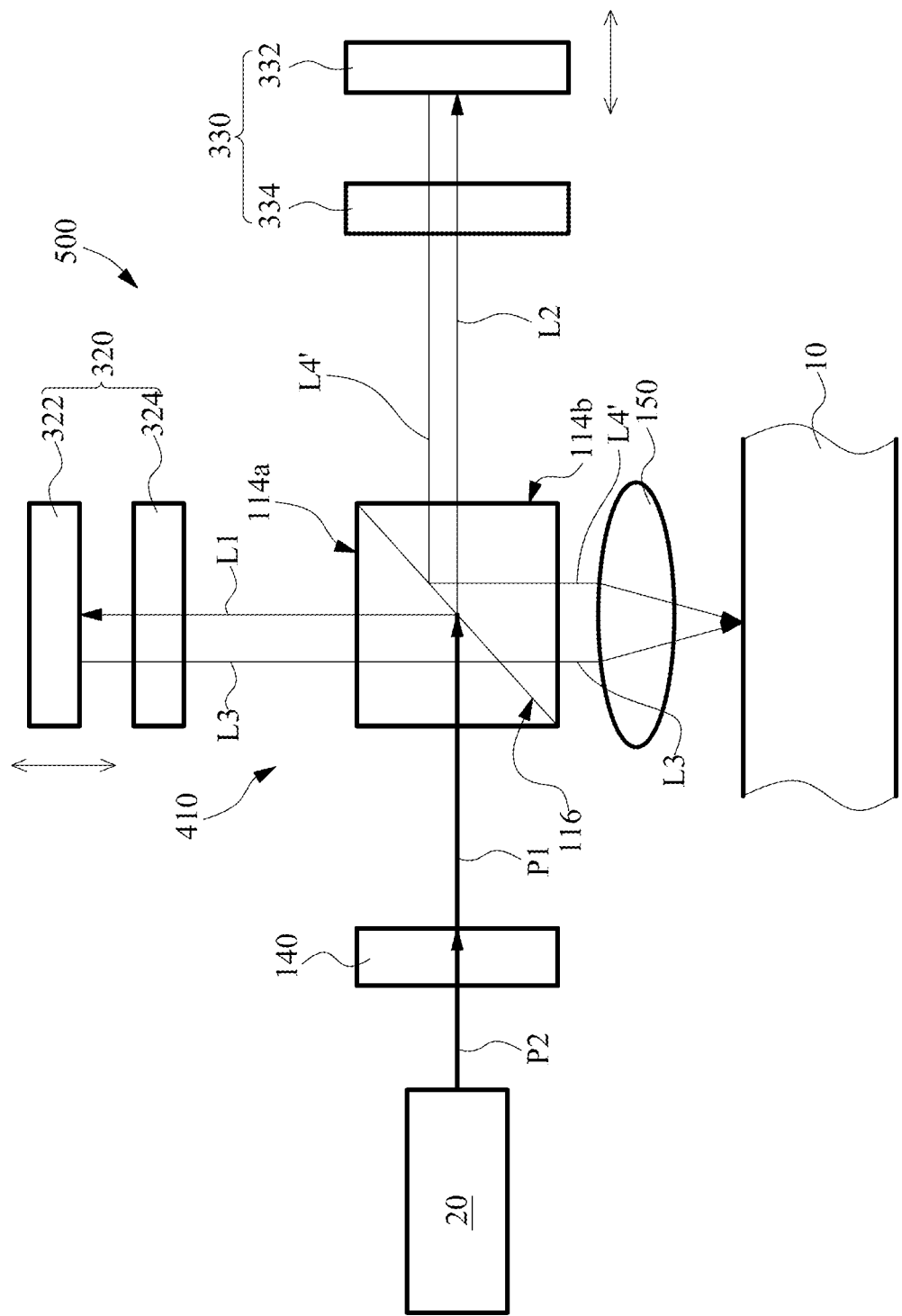
FIG. 5 is a schematic diagram showing a dual pulsed light generation apparatus according to a fifth embodiment of the present disclosure.

Please refer to FIG. 5, which is a schematic diagram showing a dual pulsed light generation apparatus according to a fifth embodiment of the present disclosure. It is noted that the apparatus of the present embodiment uses a method for generating dual pulsed beams similar to the one used by the fourth embodiment, whereas the components and structure of the dual pulsed light generation apparatus 500 shown in the fifth embodiment is also the same as the apparatus 400 of the fourth embodiment. However, the dual pulsed light generation apparatus 500 is different in that: the polarizations of the first polarization pulsed beam L1 and the second polarization pulsed beam L2 are performed by the used of transmissive polarization rotators In detail, the dual pulsed light generation apparatus 500 is comprised of a PBS 110, a first polarization reflector 320, a second polarization reflector 330, a wave plate 140 and a focusing lens 150, in which the first polarization reflector 320 is composed of a first reflection mirror 322 and a first transmissive polarization rotator 324, while the second polarization reflector 330 is composed of a second reflection mirror 332 and a second transmissive polarization rotator 334. Moreover, the first transmissive polarization rotator 324 is disposed at a position between the first reflection mirror 322 and the first plane 114a of the PBS 110; and the second transmissive polarization rotator 334 is disposed at a position between the second reflection mirror 332 and the second plane 114b of the PBS 110. Thereby, both the first transmissive polarization rotator 324 and the first reflection mirror 322 are disposed on the transmission paths of the first and the third polarization pulsed beams L1 and L3, while both the second transmissive polarization rotator 334 and the second reflection mirror 332 are disposed on the transmission paths of the second and the fourth polarization pulsed beams L2 and L4'.

As shown in FIG. 5, the first polarization pulsed beam L1 is projected on the first transmissive polarization rotator 324 so as to be polarized into a circular-polarized pulsed beam which will then be reflected by the first reflection mirror 322 and travel back toward the first polarization rotator 324 again where it is further being polarized and thus transformed into the third polarization pulsed beam L3, whose polarization direction is perpendicular to that of the first polarization pulsed beam L1.

Similarly, the second polarization pulsed beam L2 is projected on the second transmissive polarization rotator 334 so as to be polarized into a circular-polarized pulsed beam which will then be reflected by the second reflection mirror 332 and travel back toward the second polarization rotator 334 again where it is further being polarized and thus transformed into the fourth polarization pulsed beam L4', whose polarization direction is perpendicular to that of the second polarization pulsed beam L2.

In this embodiment, both the first transmissive polarization rotator 324 and the second transmissive polarization rotator 334 are quarter-wave plates, and the included angle measured between the fast axis (or slow axis) of the first transmissive polarization rotator 324 and the polarization direction of the first polarization pulsed beam L1 is about 45 degrees, while the included angle measured between the fast axis (or slow axis) of the second transmissive polarization rotator 334 and the polarization direction of the second polarization pulsed beam L2 after passing the dividing interface 116 is also about 45 degrees.

In addition, the first reflection mirror 322 is configured for enabling the same to move relative to the first plane 114a of the PBS 110 along the transmission path of the first polarization pulsed beam L1, while the second reflection mirror 332 is configured for enabling the same to move relative to the second plane 114b along the transmission path of the second polarization pulsed beam L2. Accordingly, as the lengths of transmission paths of the first polarization pulsed beam L1 and the second polarization pulsed beam L2 are changed, the optical path difference between the third polarization pulsed beam L3 and the fourth polarization pulsed beam L4' is changed and consequently the delay time measured between the polarization pulses of the third polarization pulsed beam L3 and the fourth polarization pulsed beam L4' is controlled thereby.

To sum up, the dual pulsed light generation apparatus of the present disclosure is constructed for dividing one incident pulsed beam into two polarization pulsed beams with perpendicular polarization directions, i.e. the first polarization pulsed beam and the second polarization pulsed beam. Thus, the dual pulsed laser beams generated by the dual pulsed light generation apparatus of the present disclosure can be used for material processing. For instance, in material surface treatment, it is used for forming anti-reflection micro/nano structures with stain resistance ability on the surface of a material by projecting the dual pulsed laser beams on the material. Moreover, when the dual pulsed laser beams are used for material ablation, not only the material removal efficiency can be improved, but also the amount of heat being generated during the ablation process can be greatly reduced.

Moreover, as the generation of dual pulsed beams is achieved in the apparatus of the present disclosure by the use of one PBS and two polarization reflectors, i.e. the first polarization reflector and the second polarization reflector, it is noted that the present disclosure uses only two types of optical components, i.e. PBS and polarization reflector, for dual pulsed light generation. Therefore, comparing with prior arts, there is less amount of optical components required to be configured in the dual pulsed light generation apparatus of the present disclosure.

In addition, in the present disclosure, the incident pulsed beam is first being divided into two pulsed beams by the use of a PBS, and then the two pulsed beams are respectively being transformed by two polarization reflectors, i.e. the first and the second polarization reflectors, into two polarization pulsed beams, i.e. the first polarization pulsed beam and the second or the third polarization pulsed beam, which are then being reflected back to the PBS. Thereafter, by the configuration of the dividing interfaced in the PBS, one of the two polarization pulsed beams is being reflected while allowing another one to travel passing therethrough. Accordingly, two polarization pulsed beams with perpendicular polarization directions are generated.

As in the prior arts, the dual pulsed light is generated basing upon the polarization of polarizer so that there will be energy loss to the light when it is traveling passing through the polarizer. On the other hand, since there is no polarizer required in the dual pulsed light generation apparatus of the present disclosure for the generation of dual pulsed light and also since the use of PBS in the present disclosure will enabled the divided and transformed pulsed beams to be discharged from the same light emitting surface, the energy transformation efficiency is comparatively higher than that of the prior arts.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A dual pulsed light generation apparatus, comprising:
   a polarization beam splitter (PBS), having a first plane, a second plane, and a dividing interface located between the first plane and the second plane in the transmission path of an incident pulsed beam, for dividing the incident pulsed beam into a first polarization pulsed beam and a second polarization pulsed beam while enabling the first polarization pulsed beam to be reflected by the dividing interface and thus travel passing through the first plane, and the second polarization pulsed beam to travel passing through the dividing interface;
   a first polarization reflector, disposed opposite to the first plane for transforming the first polarization pulsed beam into a third polarization pulsed beam capable of passing through the dividing interface;
   a half wave plate, disposed next to the PBS at a position on the transmission path of the incident pulsed beam, such that the half wave plate adjusts the polarization of an initial pulsed beam transforming the initial pulsed beam into the incident pulse beam containing both first polarization light and second polarization light; and
   a second polarization reflector, disposed opposite to the second plane.

2. The dual pulsed light generation apparatus of claim 1, wherein the first polarization reflector is fixed onto the first plane.

3. The dual pulsed light generation apparatus of claim 1, wherein the first plane is located next and connected to the second plane, and the second polarization reflector is provided for transforming the second polarization pulsed beam into a fourth polarization pulsed beam capable of being reflected by the dividing interface.

4. The dual pulsed light generation apparatus of claim 3, further comprising:
   a focusing lens, located on the transmission paths of the third and the fourth polarization pulsed beams.

5. The dual pulsed light generation apparatus of claim 3, wherein the first polarization reflector and the second polarization reflector are fixed respectively onto the first plane and the second plane.

6. The dual pulsed light generation apparatus of claim 5, wherein the first polarization reflector is enabled to move relative to the first plane along the transmission path of the first polarization pulsed beam.

7. The dual pulsed light generation apparatus of claim 5, wherein the second polarization reflector is enabled to move relative to the second plane along the transmission path of the second polarization pulsed beam.

8. The dual pulsed light generation apparatus of claim 3, wherein the first polarization reflector further comprises: a first reflection mirror and a first transmissive polarization rotator disposed between the first reflection mirror and the first plane; and the second polarization reflector further comprises: a second reflection mirror and a second transmissive polarization rotator disposed between the second reflection mirror and the second plane.

9. The dual pulsed light generation apparatus of claim 8, wherein the first reflection mirror is configured for enabling the same to move relative to the first plane along the transmission path of the first polarization pulsed beam and the second reflection mirror is configured for enabling the same to move relative to the second plane along the transmission path of the second polarization pulsed beam.

10. The dual pulsed light generation apparatus of claim 8, wherein any one of the first transmissive polarization rotator and the second transmissive polarization rotator is a device selected from the group consisting of: a quarter-wave plate and a magnetic polarization rotator.

11. The dual pulsed light generation apparatus of claim 1, wherein the first plane is located opposite to the second plane; and the PBS is located between the first polarization reflector and the second polarization reflector; and the second polarization reflector is provided for transforming the third polarization pulsed beam into a fourth polarization pulsed beam capable of being reflected by the dividing interface.

12. The dual pulsed light generation apparatus of claim 11, further comprising:
a focusing lens, disposed next to the PBS and on the transmission paths of the second and the fourth polarization pulsed beams.

13. The dual pulsed light generation apparatus of claim 11, wherein the first polarization reflector is enabled to move relative to the first plane along the transmission path of the first polarization pulsed beam.

14. The dual pulsed light generation apparatus of claim 11, wherein the second polarization reflector is enabled to move relative to the second plane along the transmission path of the third polarization pulsed beam.

15. The dual pulsed light generation apparatus of claim 11, wherein the first polarization reflector further comprises: a first reflection mirror and a first transmissive polarization rotator disposed between the first reflection mirror and the first plane; and the second polarization reflector further comprises: a second reflection mirror and a second transmissive polarization rotator disposed between the second reflection mirror and the second plane.

16. The dual pulsed light generation apparatus of claim 15, wherein the first reflection mirror is configured for enabling the same to move relative to the first plane along the transmission path of the first polarization pulsed beam.

17. The dual pulsed light generation apparatus of claim 15, wherein the second reflection mirror is configured for enabling the same to move relative to the second plane along the transmission path of the third polarization pulsed beam.

18. A method for generating dual pulsed beam, comprising the steps of:
using a polarization beam splitter (PBS), composed of a light-emitting surface and a dividing interface, to divide an incident pulsed beam into a first polarization pulsed beam and a second polarization pulsed beam while enabling the first polarization pulsed beam to be reflected by the diving interface and the second polarization pulsed beam to travel passing through the dividing interface and then out of the PBS from the light emitting surface;
transforming the first polarization pulsed beam into a third polarization pulsed beam capable of traveling passing through the dividing interface while enabling the third polarization pulsed beam to travel passing the dividing interface;
transforming the third polarization pulsed beam into a fourth polarization pulsed beam;
disposing a half wave plate next to the PBS at a position on the transmission path of the incident pulsed beam, such that the half wave plate adjusts the polarization of an initial pulsed beam transforming the initial pulsed beam into the incident pulse beam containing both first polarization light and second polarization light; and
enabling the fourth polarization pulsed beam to be reflected by the dividing interface and thus discharged out of the PBS through the light emitting surface.

19. The method of claim 18, further comprising the step of:
changing the optical path difference between the second polarization pulsed beam and the fourth polarization pulsed beam.

20. The method of claim 19, wherein the changing of the optical path difference between the second polarization pulsed beam and the fourth polarization pulsed beam further comprises the step of:
changing the length of the transmission path of the third polarization pulsed beam.

21. The method of claim 18, further comprising the step of:
concentrating the second polarization pulsed beam and the fourth polarization pulsed beam.

22. A method for generating dual pulsed beam, comprising the steps of:
using a polarization beam splitter (PBS), composed of a light-emitting surface and a dividing interface, to divide an incident pulsed beam into a first polarization pulsed beam and a second polarization pulsed beam while enabling the first polarization pulsed beam to be reflected by the diving interface and the second polarization pulsed beam to travel passing through the dividing interface;
transforming the first polarization pulsed beam into a third polarization pulsed beam capable of traveling passing through the dividing interface while enabling the third polarization pulsed beam to travel passing the dividing interface, and then discharging out of the PBS through the light emitting surface;
transforming the third polarization pulsed beam into a fourth polarization pulsed beam;
disposing a half wave plate next to the PBS at a position on the transmission path of the incident pulsed beam, such that the half wave plate adjusts the polarization of an initial pulsed beam transforming the initial pulsed beam into the incident pulse beam containing both first polarization light and second polarization light; and
enabling the fourth polarization pulsed beam to be reflected by the dividing interface and thus discharged out of the PBS through the light emitting surface.

23. The method of claim 22, further comprising the step of:
changing the optical path difference between the third polarization pulsed beam and the fourth polarization pulsed beam.

24. The method of claim 23, wherein the changing of the optical path difference between the third polarization pulsed beam and the fourth polarization pulsed beam further comprises the step of:
changing the length of the transmission path of the first polarization pulsed beam.

25. The method of claim 23, wherein the changing of the optical path difference between the third polarization pulsed beam and the fourth polarization pulsed beam further comprises the step of:
changing the length of the transmission path of the second polarization pulsed beam.

26. The method of claim 22, wherein further comprising the step of:
concentrating the third polarization pulsed beam and the fourth polarization pulsed beam.

* * * * *